May 17, 1966  L. MARKEL  3,251,599
TOY WITH LIGHT RAY PROJECTOR SIMULATING TRACKING OF SATELLITES
Filed March 9, 1964  3 Sheets-Sheet 1

INVENTOR.
LOUIS MARKEL
BY LeRoy J. Leishman
AGENT

May 17, 1966  L. MARKEL  3,251,599
TOY WITH LIGHT RAY PROJECTOR SIMULATING TRACKING OF SATELLITES
Filed March 9, 1964  3 Sheets-Sheet 2
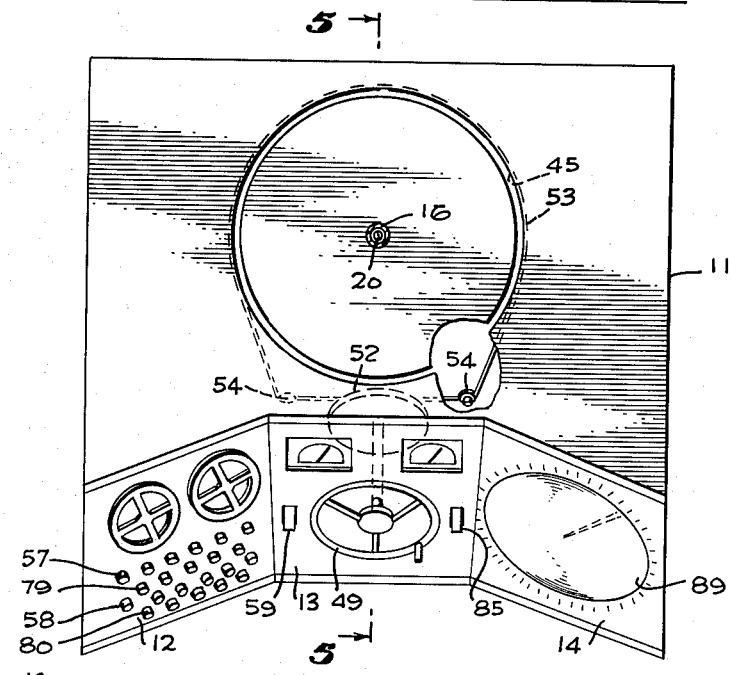
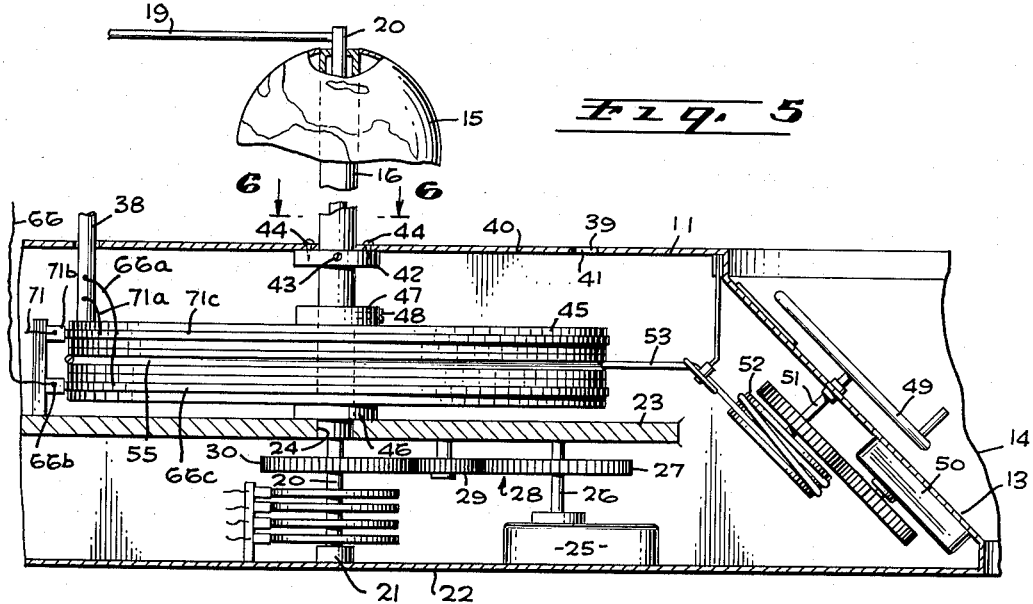
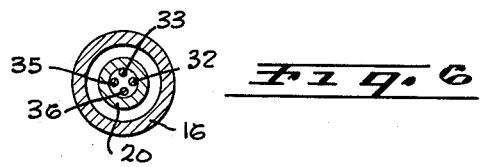
INVENTOR.
LOUIS MARKEL
BY LeRoy J. Leishman
AGENT May 17, 1966            L. MARKEL            3,251,599
TOY WITH LIGHT RAY PROJECTOR SIMULATING TRACKING OF SATELLITES
Filed March 9, 1964            3 Sheets-Sheet 3
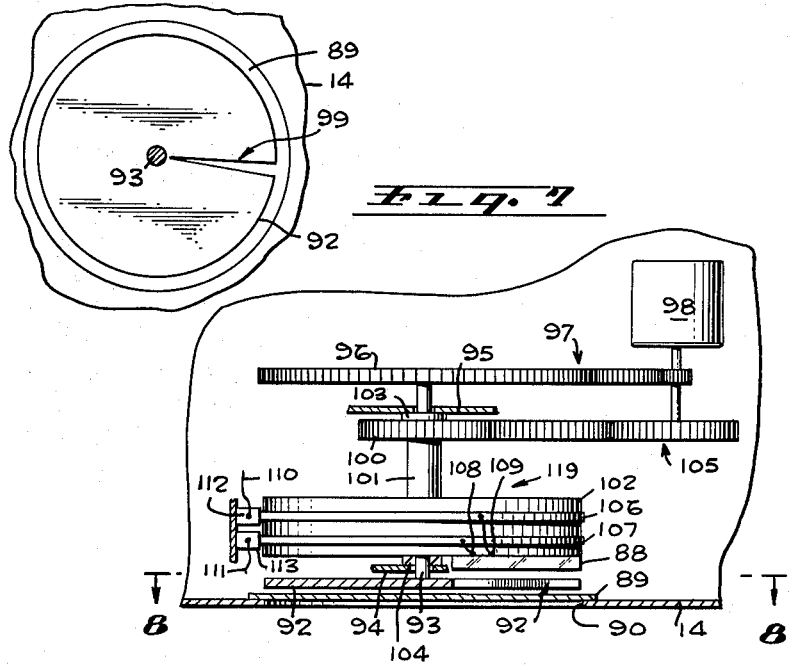
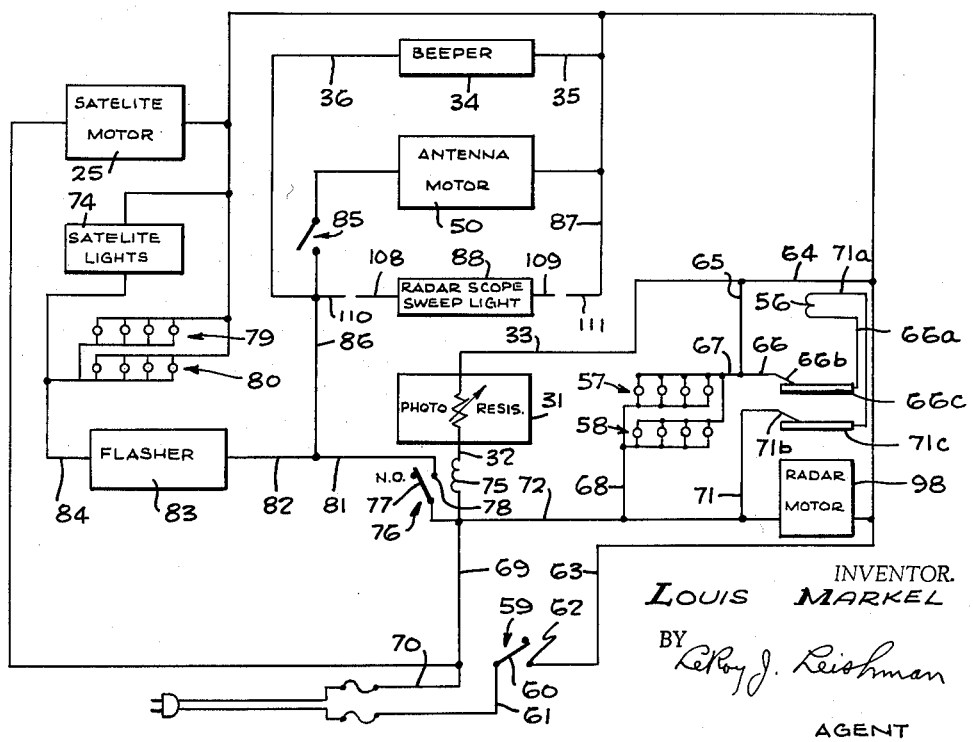
INVENTOR.
LOUIS MARKEL
BY LeRoy J. Leishman
AGENT United States Patent Office 3,251,599
Patented May 17, 1966

3,251,599
TOY WITH LIGHT RAY PROJECTOR SIMULATING TRACKING OF SATELLITES
Louis Markel, 83—49 240th St., Bellerose, N.Y.
Filed Mar. 9, 1964, Ser. No. 350,182
2 Claims. (Cl. 273—101.1)

The invention herein described pertains to toys and more particularly to a toy that simulates the orbiting of a satellite around the earth and the tracking of this satellite by means of a radar beam.

One of the objects of the invention is to provide a toy that will incorporate an exemplar of the earth and of a satellite revolving around the "earth" and a beam projector capable of directing a beam at any portion of the path or orbit of the simulated satellite.

Another object is to provide in such a toy a manual control whereby the said beam may be directed at any part of the orbit.

A further object is to provide means whereby the interception of the satellite by the beam will be indicated on a dial simulating a radar scope.

An additional object is to provide means for automatically keeping the beam upon the satellite as it rotates in its orbit after it has once been intercepted by the beam.

Another object is to provide means in connection with the simulated radar scope for indicating the position of the satellite in its orbit at the moment of interception.

A further object is to provide rows of simulated computer lights that will remain on whenever the motors in the toy are operating.

An additional object is to provide other rows of similar lights on the "instrument" panel that will be illuminated during the time that the radar beam is intercepting, or "latched on" to, the satellite.

Another object is to provide switching means on the cabinet or console for controlling various functions of the apparatus.

A further object is to provide two concentric calculating discs for use in connection with the toy for determining the angular position of the satellite in its orbit at the time of each interception by the "radar" beam, or when readings are taken at different times during its traversal of its orbit.

Still another object is to provide a map or graph on which the successive positions of the satellite when the readings are taken may be recorded so that its path may be plotted thereon.

This invention possesses many other advantages, and has other objects which may be made more clearly apparent from a consideration of an actual embodiment of the invention. For this purpose, such an embodiment is shown in the drawings accompanying and forming a part of the present specification. This embodiment will now be described in detail, illustrating the general principles of the invention; but it is to be understood that this detailed description is not to be taken in a limiting sense, since the scope of the invention is best defined by the appended claims.

In the drawings:

FIGURE 1 is an isometric view of one embodiment of the invention, showing a globe that simulates the earth, an exemplar of a satellite encircling the earth, a beam projector exemplifying a radar antenna, and a cabinet or console on which these various devices are suitably mounted, the cabinet or console having panels for operating the equipment and for revealing the information obtained by the tracking equipment regarding the position of the satellite at any time;

FIG. 2, on the second page of the drawings, is a plan view of the cabinet or console, revealing certain components thereof;

FIG. 5 is a section taken substantially on line 5—5 of FIG. 2;

FIG. 6 is a section taken on line 6—6 of FIG. 5;

FIG. 7 is a cut-away view taken from above the cabinet in a direction parallel to the plane of the simulated radar scope dial, showing diagrammatically the apparatus whereby the simulted radar scope is operated;

FIG. 8 is a section taken on line 8—8 of FIG. 7; and

FIG. 9 is a schematic view of the electrical components of the toy and their electrical connections.

Figure 1:
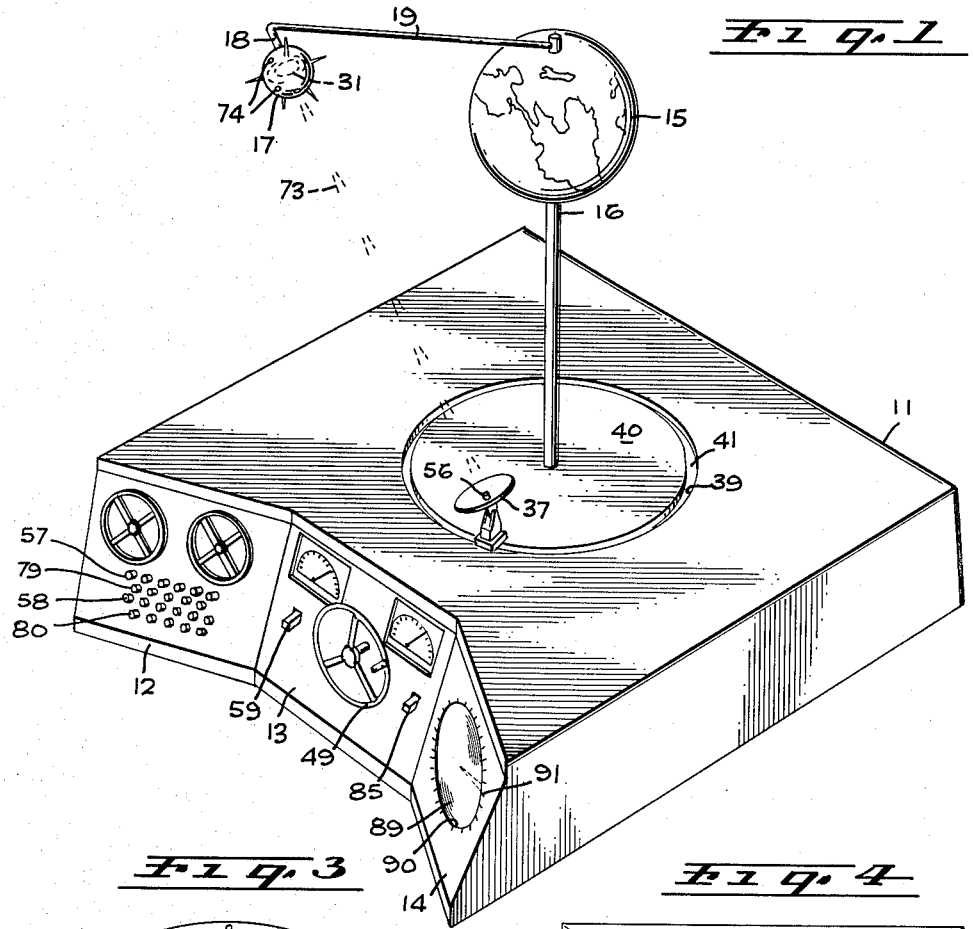

The illustrated embodiment of the invention comprises a cabinet 11 having three instrument panels 12, 13 and 14 arranged on one side thereof in the manner of a control console and supporting exemplars of the earth, a satellite and a radar antenna.

The globe 15 which exemplifies the earth in mounted flush with the upper end of a tube 16 that is anchored by means hereinafter explained on structure provided within the cabinet 11.

An exemplar 17 of a satellite is carried on the lower end of a tube 18 that depends at an angle from the tube 19 which extends horizontally from a tube 20 (FIG. 5) that is concentrically disposed within the tube 16. The lower end of the tube 20 is rotatably mounted in a bearing member 21 supported on the floor or base 22 of the pedestal or cabinet 11.

A horizontal platform or partition 23 is mounted in any convenient manner within the cabinet 11. The lower end of the tube 16 is non-rotatably anchored within a hole 24 in this platform.

The rotatable shaft 20 that indirectly supports the satellite has rigidly secured thereto a gear member 30 which is the final driven member in a gear train whereby the motor 25 rotates the tube 20. The upper end of the drive shaft 26 of the motor 25 rotates the tube 20. The upper end of the drive shaft 26 of the motor 25 may appropriately be journaled in the platform 23, and it has rigidly mounted theeron a gear member 27 that is the first element in the gear train 28 shown diagrammatically in the figure. The motor 25 is a synchronous motor, and in the preferred embodiment of my device it may be one that is manufactured for a clock, and the shaft 26 may be the one that drives the minute hand. If the two end gears of the gear train 28 are of the same size and connected only by an intermediate idler 29, the shaft 20 will make one revolution every minute. This will of course cause the satellite 17 suspended from the tube 19 to make one orbit around the globe every minute.

An exemplar 37 of a radar antenna (FIG. 1) is mounted in a manner hereinafter to be described for rotation around the tube 17 so that a beam 73 emitted by the "antenna" and extending therefrom at a predetermined angle may successively intercept all points in the satellite's orbit. The "antenna" is supported on a tubular member 38 (FIG. 5) which is integrally attached to a rotatable drum 45. The tubular member 38 extends upward through an annular recess 41 between a circular opening 39 in the upper surface of the cabinet and a central disc 40 which is secured in any suitable way to the tube 16, as indicated in FIG. 5, where a collar 42 is shown surrounding the tube and attached thereto by means of a screw 43. The collar is attached to the disc 40 by screws 44 or other appropriate means.

The drum 45 is rotatably mounted on the stationary tube 16 between the spacer 46 beneath the drum and the collar 47 above the drum. This collar may be held in place by any appropriate means such as the set screw 48.

The drum 45 may be manually rotated by means of the hand wheel 49 (FIGS. 2 and 5) or the synchronous motor 50. The hand wheel is secured to the exterior end of the shaft 51 which is rotatably mounted in any suitable manner in the central panel 13 of the console. The inner end of this shaft carries a pulley drum 52. The belt 53 extends around this driving pulley and also around the large groove drum 45 that rotates around the shaft 16. Two guide pulleys 54 are suitably interposed at an angle between the pulleys 52 and 45 to guide the belt 53 as it moves between the pulley 52 and the groove 55 in the large drum.

The rotation of the hand wheel 49 of course rotates the drum 45 which carries with it the "radar antenna" that is mounted on the tubular post 38. This "antenna" or beam projector incorporates a flashlight 56 (FIG. 1) directed at the path described by the "satellite" as it rotates around the globe 15. In the presently preferred embodiment of the invention, this radar antenna light is connected in the same circuit that energizes the first and third rows of "computer" lights 57 and 58 on the left panel 12 of the console. These two rows of lights and the antenna light are illuminated as soon as the main switch 59 is turned from the "off" to the "on" position. This switch is located on the central panel 13. The pole or movable contact 60 of the switch is connected to the input circuit conductor 61, as shown in FIG. 9. When the movable arm 60 engages the stationary contact 62, the current flows through the conductors 63, 64 and 65 to the conductor 66 (FIGS. 9 and 5) and then to the wiping contact 66b which engages the conductor ring 66c on the non-conducting drum 45. From this ring the current flows through conductor 66a (FIGS. 5 and 9) to the antenna beam lamp 56 and then through conductor 71a to the slip ring 71c on the drum. This slip ring is engaged by the wiper 71b from which the current flows through conductors 71, 72 and 69 to the power conductor 70 which is a companion power conductor of the previously mentioned conductor 61. It will thus be seen that the beam lamp 56 is energized as soon as the main switch 59 is closed.

In the presently preferred embodiment of my invention, the first and third rows 57 and 58 of the computer lights on the left panel 12 of the console are also immediately energized with the closing of the main switch 59. It will be observed in FIG. 9 that these two rows of lights are connected in parallel between conductors 67 and 68 which are connected respectively to the previously mentioned conductors 65 and 72.

While the satellite 17 (FIG. 1) turns in its orbit, the hand wheel 49 on the central panel 13 may be turned in order to drive the antenna 37 around the tube 16 so that a beam 73 from the antenna will also traverse the orbit of the satellite and cause the beam 73 to intercept the satellite at some position in its orbit. The satellite is so equipped that it will emit beeps and blink its lights 74 as soon as this occurs. These means include the conductors 32, 33, 35 and 36 of FIGS. 9 and 6, the latter figure showing these conductors within the tube 20 from which they pass through tube 19 and thence through tube 18 to the satellite which the latter tube supports. The conductors 32 and 33 are connected to the photocell 31 as shown in the circuit diagram of FIG. 9, where the conductors 35 and 36 are also shown connecting the beeper 34 in parallel with the photocell.

When the beam 73 from the "radar antenna" intercepts the satellite and falls upon the photocell 31, the resistance across the cell between conductors 32 and 33 materially drops, which the result that sufficient current flows through the coil 75 of the normally open relay 76 to move its armature 77 into engagement with the stationary contact 78. When this happens, the beeper beeps, the satellite lights 74 and the second and fourth rows of computer lights 79 and 80 on the instrument panel 12 flash. The circuit that effects this is completed in the following described manner: the engagement of armature 77 of the relay with the stationary contact 78 of course connects this contact with the hot side of the current supply line 69, and the current flows from contact 78 through conductors 81 and 82 to the flasher 83 which is in parallel with the two rows of computer lights 79 and 80 as well as with the satellite lights 74, as shown in the circuit diagram of FIG. 9. Whenever the contacts close in the flasher, the current flows through conductor 84 to the two banks of lights 79 and 80 as well as to the satellite lights. The opposite terminals of these computer lights and of the satellite lights are connected as shown in the circuit diagram to the conductor 63 which is connected directly to the contact 62 that was connected into the circuit at the time of he original closing of the main switch 59.

If the switch 85 for the antenna motor had previously been closed, the energizing of relay 76 also starts the antenna motor 50 so that the radar antenna will continue to track the satellite after it has once been latched onto through the interception by the photocell of the radar beam. This is effected in the following described manner:

When relay 76 closes, current flows from conductor 81 through conductor 86 to the antenna motor switch 85 and thence through the antenna motor to conductor 87 which is connected to the previously energized conductor 63.

Motor 50, which may also be a clock motor, is physically shown in FIG. 5 where a gear train is diagrammatically illustrated between the shaft of this motor and the shaft 51 that drives the drum 52 which is initially driven by the hand wheel 49 until the radar beam intercepts the satellite and closes the circuits energizing the antenna motor. This is a synchronous motor and of course driven from the same alternating current source that operates the synchronous motor 25, and since the gear reductions are the same for both motors, the antenna will continue to track the satellite until one or other of the motors is de-energized.

The closing of relay 76 also energizes the radar scope sweep light 88 which is connected in series between the previously mentioned conductors 86 and 87. This will be better understood after the mechanism of the radar scope has first been explained.

The simulated radar scope preferably comprises a frosted or translucent disc 89 simulating the face or end of a radar tube. This disc is mounted in any suitable way in an opening 90 in the panel 14 (FIGS. 2 and 7). Surrounding this opening, a scale 91 is suitable mounted, printed or inscribed on the panel 14, the scale preferably being divided into increments of five degrees. Behind the translucent disc 89 and concentric therewith, a target plate 92 is rigidly secured to the external end of a rotatable shaft 93 which is journaled in spaced brackets 94 and 95 suitably supported in the cabinet 11.

The opposite end of shaft 93 rigidly supports the end member 96 of a diagrammatically illustrated gear train 97. This gear train is driven by a synchronous motor 98, the gear reduction preferably being such that the shaft 93 and the target plate 92 mounted thereon will make one revolution every thirty-six minutes. The target plate 92 has a wedge-shaped slot 99 cut therein having an angular width of about five degrees. The purpose of this target plate and the radial slot will be apparent after associated structure has been explained.

A rotatable assembly 113 comprising a gear 100, an integrally attached sleeve 101 and a drum 102 rigidly secured to sleeve 101 are rotatably mounted on the shaft 93 between the spacing washers 103 and 104. The gear 100 of this rotatable assembly is also the end member in the gear train 105 which is driven by the radar motor, the gear reduction being such that the assembly 119 makes one revolution every thirty seconds.

Th lower face of the drum 102 carries a sweep light 88 having a wedge-shaped illuminated area of about five degrees of arc. The sweep light is so mounted on the drum that it is capable in certain angular positions of the drum and of the target plate 92 of registering with the slot 99 in the target plate.

The drum 102 carries two conducting bands 106 and 107. If the drum 102 is not itself constructed of insulating material, the rings or bands 106 and 107 must be appropriately insulated from each other. The bands 106 and 107 are connected respectively by means of conductors 108 and 109 to the sweep light 88.

Current is brought to the conducting ring 107 by the brush or wiper 113 which is connected by means of conductor 111 to the conductor 87. Conductor 87 receives its current from one side of the power line via conductor 63 and the main switch 59, as previously described. Ring 106 receives its current through brush 112, conductors 110, 86 and 81, the contacts of relay 76 and conductor 69 which is connected to the incoming hot line 70.

From the foregoing description of the circuits in which the radar scope sweep light is connected, it will be seen that the sweep light is on whenever the relay 76 has been energized by the current passing through the photocell 31.

Inasmuch as the radar motor is in the circuit whenever the main switch 59 is in its closed position, the drum 102 is constantly carrying the sweep light around the target plate 92 at a speed of one revolution every thirty seconds. If plate 92 were stationary, the light would thus shine through the five-degree-wide slot 99 in the plate 92 every thirty seconds, and be visible as a narrow wedge-shaped flash on the "radar scope." But since the plate 92 is rotating, the frequency of the flashes on the scope depends upon the angular position in which the sweep light finds the slot. Inasmuch as the target plate makes one revolution every thirty-six minutes, the five-degree slot advances an angular distance of five degrees between each successive traversal by the sweep light. The sweep light thus must move 365 degrees between successive passes over the slot, and the time interval between successive flashes is accordingly 1/144 of a second more than 1/30 of a second. For all practical purposes, however, it may be said that a new reading of the angular position of a flash on the scope may be made every thirty seconds.

Figure 3:
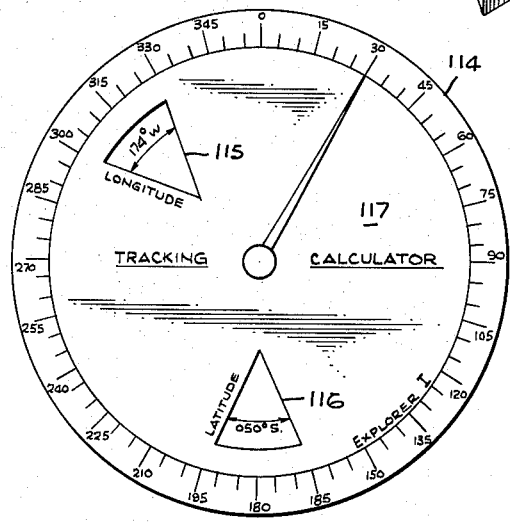
FIG. 3 is a plan view of concentric discs having calibrations and indicators; and openings on the top disc through which certain information may be viewed that is related to the position of the indicator with respect to the calibrations.
Figure 4:
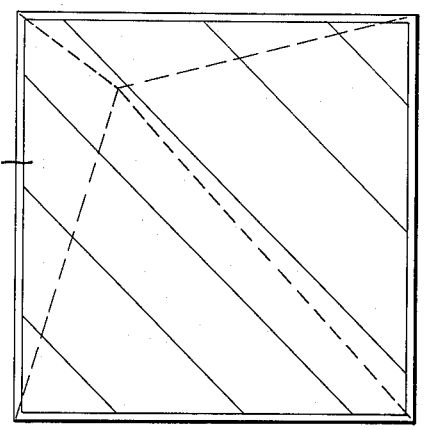
FIG. 4 is a plan view of a map of the earth having certain coordinates thereon whereby the positions of the satellite may be plotted.

The tracking calculator makes it possible to determine the position of the satellite over the earth's surface for each of these individual readings. The angular position of the illuminated wedge is observed on the scale 91 on the periphery of the scope. Inasmuch as the location of the satellite's orbit is of course always the same on this toy, the angular position of the satellite in this orbit thus determines the latitude and longitude of a spot on the earth directly below. The latitude and longitude of these successive positions may be read on the lower disc 114 of the tracking calculator shown in FIG. 3 through the openings 115 and 116 in the upper disc 117, and these positions may be plotted on a map 118 shown diagrammatically in FIG. 4.

Various modifications may of course be made in the illustrative embodiment hereinbefore described, and various elements may be omitted, added, replaced, rearranged or transposed without departing from the broad spirit of the invention as succinctly set forth in the appended claims.

The inventor claims:

1. In a toy for simulating the tracking of a satellite: a cabinet having a relatively large central aperture in the top side thereof; a first rotatable tube extending from the interior of said cabinet through the approximate center of said aperture; means in said cabnet for rotatably supporting said first tube; a second tube surrounding said first tube and extending from the interior of said cabinet to a position near the top of said first tube; a sphere simulating the earth surrounding the top end of said second tube; a disc so mounted on said second tube within said aperture that its top surface is substantially flush with the top surface of said cabinet, the diameter of said disc being sufficiently smaller than that of said aperture to leave a relatively narrow annular slot between the disc and the edges of the aperture; a third tube extending laterally from said first tube; a simulated satellite mounted on the external end of said third tube; a wheel of larger diameter than said disc rotatably mounted on said second tube beneath said disc; a supporting element mounted on said wheel and extending through said annular slot; an assembly simulating a tracking antenna mounted on said element above said disc and top surface, said assembly comprising means for directing a narrow light beam at the path traversed by said satellite; means comprising a first synchronous motor for rotating said first tube at a desired speed; a simulated instrument panel on said cabinet; a first shaft extending through said panel; a first drum rigidly secured to said first shaft within said cabinet; means at least operatively connected to said first shaft exterior of said panel whereby said first shaft may be manually rotated; transmission means operatively connecting said first drum and wheel whereby said wheel and assembly may be rotated around said first tube upon rotation of said manually operable means; a second synchronous motor operatively connected to said first shaft whereby said first shaft may be rotated at a predetermined speed; a translucent dial mounted in an opening in said panel; a second shaft so mounted within said cabinet that its axis of rotation is substantially concentric with said dial; an opaque disc rigidly mounted on the end of said second shaft in close proximity to said dial, said opaque disc having a radially disposed wedge-shaped slit therein with its apex near the center of said disc; a third synchronous motor in said cabinet operatively connected to said second shaft for rotating it at a predetermined speed; a second drum mounted for rotation around said second shaft; illuminating means on the under-surface of said second drum facing said dial for selectively illuminating said slit; means driven by said third synchronous motor for rotating said second drum at a predetermined speed; a relay comprising a pair of contacts and an electromagnet for closing said contacts; a photo cell so disposed in said satellite that it will be in the path of said beam when the beam is intercepted by the satellite, said cell acting to energize said electromagnet when the cell is intercepted by said beam; an electrically operable light carried by said satellite; and electrically operable lights on said instrument panel; said contacts acting when closed by said electromagnet to energize the light in said satellite and the lights on said panel.

2. In a toy for simulating the tracking of a satellite: a pedestal; an exemplar of the earth supported above and by said pedestal in spaced relationship thereto; an exemplar of a satellite driven by electrically operable means in a circular path around the exemplar of the earth; a device simulating a radar antenna supported at least indirectly by said pedestal for bodily movement thereover in a circle concentric with said circular path; both manually operable means and electrically operable means for moving said device around said circle; means carried by said device for emitting a light beam so directed that it will intercept said path; switching instrumentalities for actuating said second mentioned electrically operable means in response to the intercepting of said beam by said satellite exemplar; and a light-responsive signalling instrumentality carried by the satellite exemplar for indicating when the satellite exemplar is intercepting the beam.

References Cited by the Examiner

UNITED STATES PATENTS

| | | | |
|---|---|---|---|
| 2,886,919 | 5/1959 | Glass et al. | 46—227 |
| 3,028,687 | 4/1962 | Johnson | 35—46 |

FOREIGN PATENTS 998,125  9/1951  France.

OTHER REFERENCES

"Satellite Triangulation," U.S. Government Printing Office, Washington, D.C., 1962, pp. 1, 3, 10, and 16 relied upon.

RICHARD C. PINKHAM, *Primary Examiner.*